United States Patent [19]

Gergoe et al.

[11] Patent Number: 4,937,977
[45] Date of Patent: Jul. 3, 1990

[54] STABLE WINDOW GUIDE AND LIFT MODULE FOR A FRAMELESS DOOR

[75] Inventors: Bela Gergoe, Birmingham; Allan C. Acciacca, Utica, both of Mich.

[73] Assignee: General Motors Corporation, Detroit, Mich.

[21] Appl. No.: 348,829

[22] Filed: May 8, 1989

[51] Int. Cl.⁵ .................................... E05F 11/48
[52] U.S. Cl. ............................ 49/352; 49/360; 49/375
[58] Field of Search ............. 49/227, 352, 360, 374, 49/375

[56] References Cited

U.S. PATENT DOCUMENTS

| | | | |
|---|---|---|---|
| 3,413,760 | 12/1968 | Gorys et al. | 49/375 |
| 4,110,935 | 9/1978 | Sessa | 49/352 |
| 4,648,205 | 3/1987 | Ono | 49/374 |
| 4,823,507 | 4/1989 | Miller | 49/360 X |

Primary Examiner—Gary L. Smith
Assistant Examiner—Michael Milano
Attorney, Agent, or Firm—William A. Scheutz

[57] ABSTRACT

A vehicle door assembly having a frameless window and a window guide and lift module arrangement which includes a pair of side pin guides slidably guided in a pair of guide channels and a collapsible central guide means which extends when the window is raised to provide a connection point located beneath the bottom edge of the window to stabilize the same when in its closed position but which is collapsible when the window is lowered to allow it to be fully received within the door assembly.

6 Claims, 4 Drawing Sheets

Fig. 5

STABLE WINDOW GUIDE AND LIFT MODULE FOR A FRAMELESS DOOR

The present invention relates to a vehicle door assembly and, more particularly, to a vehicle door assembly having a frameless window and a window guide arrangement which includes a central collapsible guide means which extends when the window is raised to provide a connection point located substantially beneath the bottom edge of the window to stabilize the same, but which is collapsible when the window is lowered to allow it to be fully received within the door assembly.

Certain automotive vehicles employ side door assemblies having windows which are unframed or frameless. In such door assemblies the window at its sides adjacent its bottom edge is usually slidably guided for movement along a pair of stationary guides or guide channels located within the door assembly as the window is moved between a fully open position in which it is disposed within the door assembly and a closed position in which most of the window is located above the belt line of the door assembly. In its closed position, the window adjacent its side and top edges engages a seal secured on the body structure of the vehicle defining the door opening. In these known door assemblies, the window is generally moved between its raised and lowered position by a suitable window regulator mechanism, usually a cross arm window regulator, which is operatively connected to a sash channel mounted adjacent the bottom edge of the window to provide both support for the window and to affect raising and lowering movement of the window.

In these known door assemblies, the window is connected or supported at three locations, i.e., adjacent its bottom edge at its fore and aft sides and intermediate its sides as a result of its connection with the window regulator mechanism. However, since the window regulator is connected to the sash channel which attached adjacent to the bottom edge of the window, these three support or connection points generally lie in the same horizontal plane. Since the three connection points are all adjacent the bottom edge of the window slightly below the belt line of the door assembly, the unframed window has a tendency to pivot about a horizontal axis adjacent the belt line toward and from the seal means around the door opening on the vehicle body.

In order to affect good sealing engagement between the unframed window and the seal on the vehicle body, when using such a three point connection arrangement, stabilizers carried by the door assembly and engageable with the window when it is in its closed position have been employed to try to stabilize it against any pivotal movement toward and from the seal on the vehicle. While these known arrangements have been satisfactory in operation, they nevertheless require the addition of a stabilizer means in order to ensure that there is adequate sealing pressure between the unframed window and the seal.

In accordance with the provisions of the present invention, a novel window guide arrangement for guiding and stabilizing an unframed window for a frameless door assembly is provided which eliminates the need for separate stabilizers to engage the window when it is raised to its fully closed position, but yet provides good stability for the window to prevent the same from moving in and out or toward and from the seal when in its fully closed position. The novel window guide arrangement includes a central collapsible guide means which automatically extends when the window is raised to provide a connection point located substantially beneath the bottom edge of the window to stabilize the same, but which is collapsible when the window is lowered to allow it to be fully received within the door assembly. By providing connection points at the fore and aft sides of the window and a central connection point well beneath the bottom edge of the window when the window is in its closed position, good stability is provided, since the three connection points define an imaginary triangle therebetween and do not all lie in the same horizontal plane.

A broad object of the present invention is to provide a new and improved vehicle door assembly having a frameless window and a window guide arrangement which includes a central collapsible guide means which extends when the window is raised to provide a connection point located well beneath the bottom edge of the window to stabilize the same, but which is collapsible when the window is lowered to allow it to be fully received within the door assembly.

Another object of the present invention is to provide a new and improved door assembly, as defined in the preceding object, and in which the window guide arrangement includes first and second stationary guides located adjacent the fore and aft ends of the door assembly and a third stationary guide located approximately midway between the fore and aft ends of the door assembly, first and second pin guides secured to the window adjacent its bottom and slidably connected to the first and second stationary guides for movement therealong, and a collapsible guide means carried by the window and slidably connected to the third stationary guide for movement therealong and in which the collapsible guide means is biased toward an extended position in which its sliding connection with the stationary guide is located a given distance beneath the bottom edge of the window so that when the window is in its closed position it is supported at its opposite sides adjacent the belt line of the door assembly and at a location midway and substantially below its bottom edge to provide a three point connection which defines an imaginary triangle whereby the window is highly stabilized when in its closed position, and wherein the collapsible guide means is slidable along the third stationary guide as the window is moved through a first portion of its movement toward its open position until it bottoms against an abutment adjacent the lower end of the third stationary guide and then is collapsed as the window is further lowered through a second portion of its movement to its fully open position in order to allow the window to be fully received within the door assembly.

A further object of the present invention is to provide a new and improved door assembly, as defined in the next preceding object, and in which the first, second and third stationary guides are an integral part of a support module to which the window is slidably connected and which also supports a window regulator mechanism, preferably a cable drive window regulator mechanism, which holds the window in any position to which it is moved whereby the window guide arrangement and window regulator mechanism comprise a preassembled unit which can be mounted as a module within the door assembly.

Yet anther object of the present invention is to provide a new and improved door assembly, as defined in the next preceding object, and in which the collapsible guide means comprises a slide block secured to the window adjacent its bottom edge, a slide slidably connected to the slide block and having its lower end slidably connected to the third stationary guide and a spring means operatively connected to the lower end of the slide and the slide block for biasing the slide downwardly to an extended position in which a stop on the slide engages a stop on the guide block and in which the sliding connection between the slide and third stationary guide is located a given distance beneath the bottom edge of the window, and in which the slide of the collapsible guide means is in its extended position when the window is in its closed position and in which the slide and slide block of the collapsible guide means are slidable in unison along the third stationary guide as the window is being moved downwardly through a first portion of its movement until the slide engages an abutment adjacent the lower end of the third stationary guide and thereafter being slidable relative to each other as the window is further lowered to its fully open position.

A still further object of the present invention is to provide a new and improved door assembly, as defined in the next preceding object, and in which the cable drive window regulator mechanism has a figure eight drive loop and has its cable connected to each of the side pin guides for the window.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

Figures 1, 2:
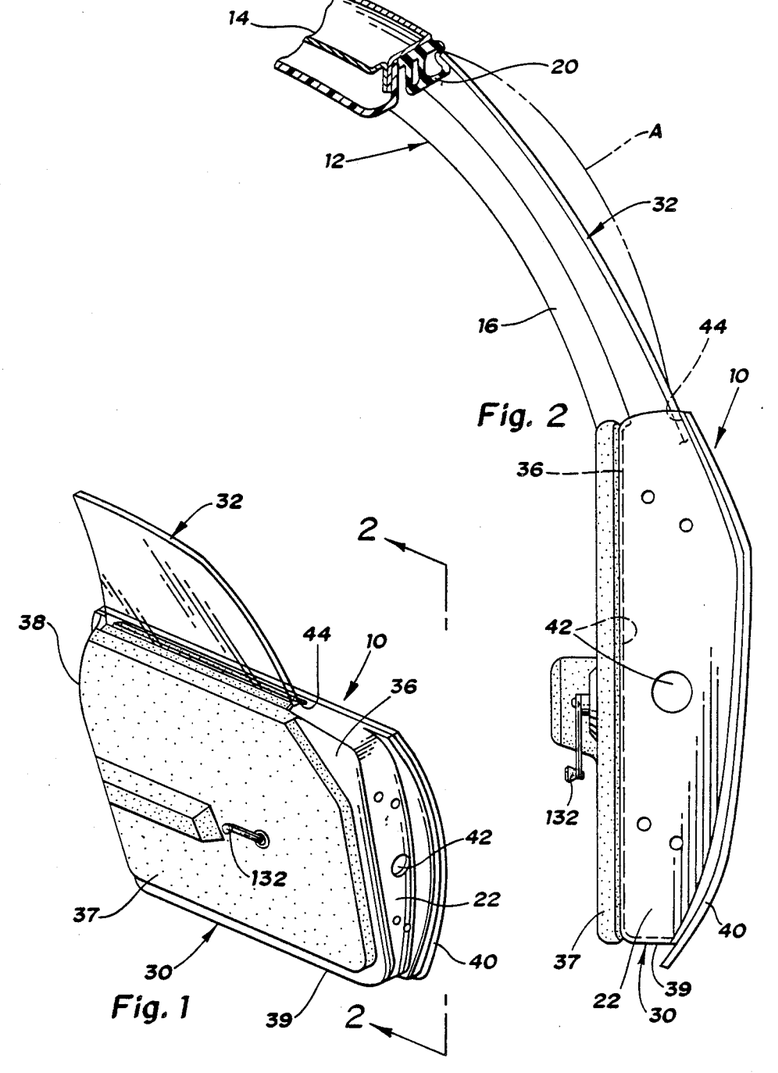
FIG. 1 is a perspective view of a frameless door assembly for a automotive vehicle which embodies the novel window guide and lift module of the present invention.
FIG. 2 is an end elevational view of the door assembly of FIG. 1 and showing the window in its fully closed position and in engagement with the seal means carried by body structure of an automotive vehicle.

The present invention provides a novel door assembly 10 for use with an automotive vehicle. The automotive vehicle would have body structure 12 defining a door opening in its side. The body structure 12 would include a roof 14 and a pair of side pillars 16 (only one of which is shown in FIG. 2). The roof 14 and side pillars 16 carry a seal 20 extending around the periphery of the door opening and which is adapted to be engaged by the door assembly 10 when the latter is in its closed position.

The door assembly 10 would be suitably hinged at its front or fore end 22 to its adjacently located pillar 16 via suitable hinges (not shown) for movement between open and closed positions. The door assembly when in the closed position would engage the seal 20 carried by the vehicle body structure 12.

Figure 3:
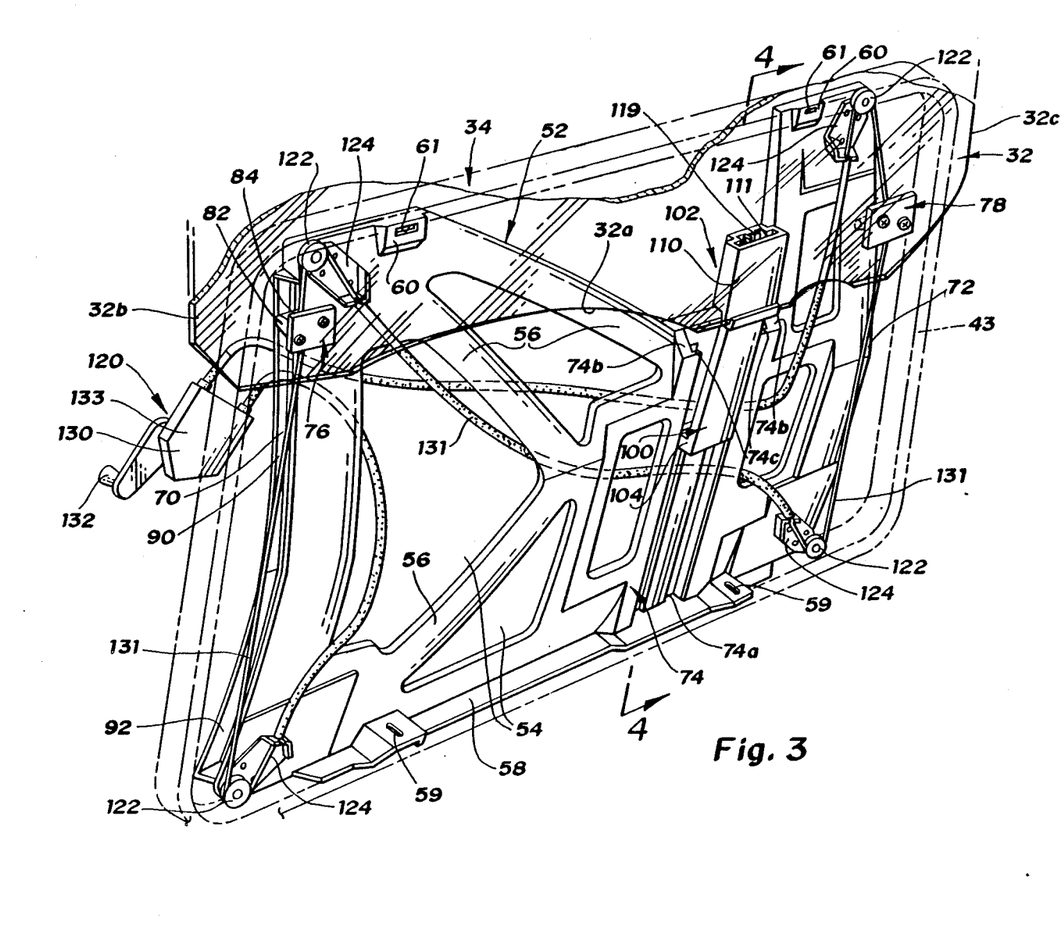
FIG. 3 is a fragmentary perspective view of the novel window guide and lift module of the present invention and showing the parts thereof in their positions in which the window is in its fully closed position.

The door assembly 10 comprises a door or door means 30, an unframed window 32 and a window lift and guide module 34 (see FIG. 3).

The door 30 comprises an inner panel 36, preferably made from molded plastic, and to which a decorative trim panel 37 can be attached. The inner panel 36 is molded to the shape shown in FIG. 1 and includes the front end 22, a rear end 38 and a bottom 39, all of which are integral with the inner panel 36. The door 30 further includes an outer panel 40, preferably made from a suitable plastic material, which is adapted to be secured to the inner panel and which defines with the inner panel 36, the front, rear and bottom, 22, 38 and 39, respectively, an interior compartment 42. The inner and outer panels 36 and 40 are spaced so that the door has a top opening 44 in communication with the compartment 42 through which the window glass 32 extends. The door 30 further includes a generally rectangularly shaped frame 43 which is secured to the ends 22, 38 and bottom 39 of the inner panel 36 to provide a reinforcement support and ring.

Figure 5:
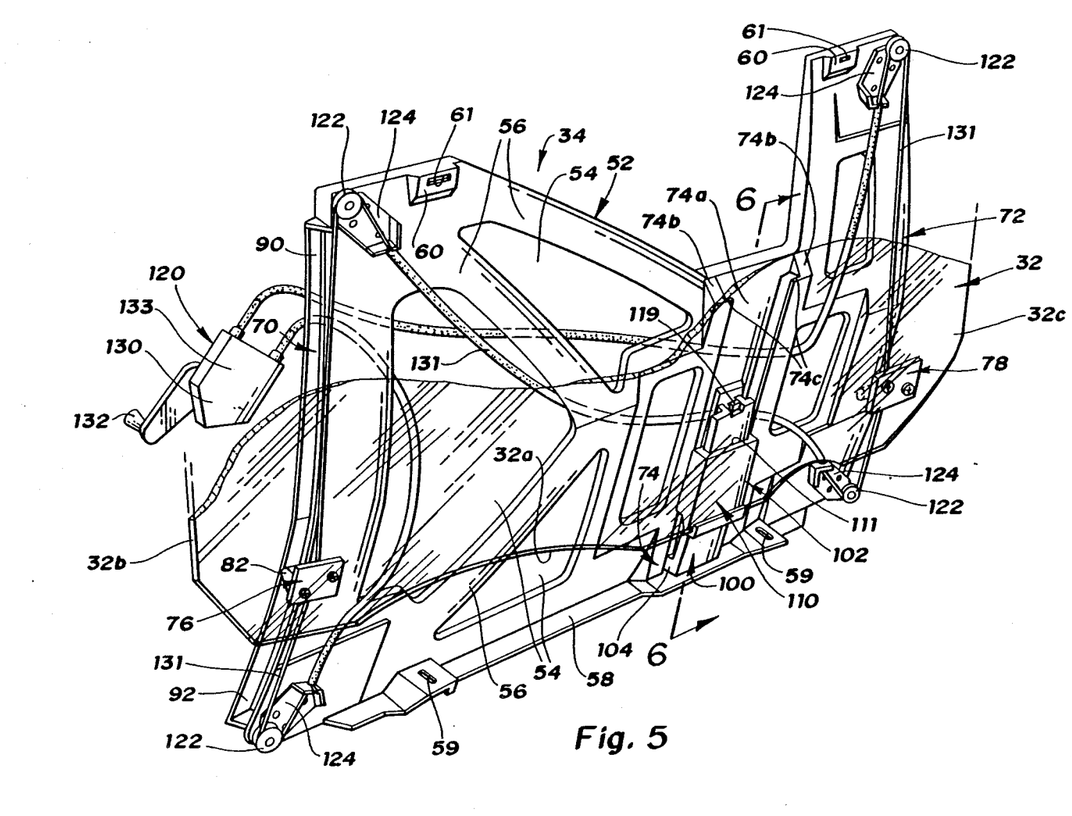
FIG. 5 is a view like that shown in FIG. 3, but showing the parts thereof in their positions in which the window is in its fully open position.
Figure 6:
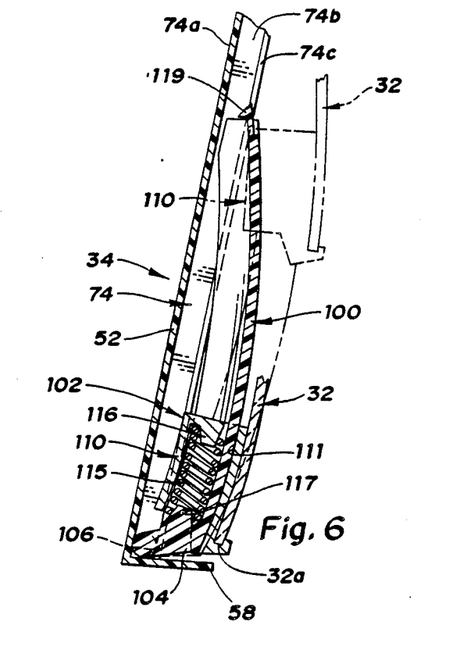
FIG. 6 is a fragmentary sectional view looking in the direction of the arrow 6—6 of FIG. 5.

The window 32 is unframed and is adapted to be moved between open and closed positions. The window 32 when in its closed position and when the door is closed, has its side and upper edge portions engageable with the seal 20. The window 32 when moved to its open position, as shown in FIG. 5, is wholly received within the compartment 42 in the door 30.

In accordance with a major provision of the present invention, a novel window support guide and lift module 34 is provided for guiding and moving the window 32 between its open and closed positions. The novel modular arrangement 34 comprises a one piece, molded plastic frame 52 which is molded to the shape shown in FIG. 3. The frame 52 is of a generally rectangular shape but is curved, as viewed in side elevation, so as to conform to the curvature of the door 30, as viewed in side elevation. The frame 52 has a plurality of openings 54 therethrough which define a series of braces 56 to provide a rigid support frame 52. The support frame 52 has a bottom ledge 58 provided with slots 59 to enable the frame 52 to be bolted to the reinforcement ring 43 in the door 30 via suitable bolts (not shown). The frame 52 at its top is provided with bosses 60 having slotted openings 61 therethrough to enable it to be snap fittingly attached via suitable fasteners (not shown) to a boss on the reinforcement ring 43. This four point attachment securely retains the frame to the reinforcement ring 43, which in turn is securely bolted to the inner door panel 36.

Figure 7:
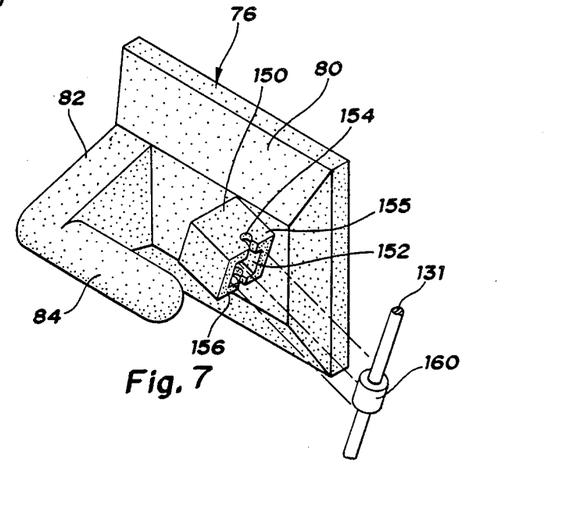
FIG. 7 is a perspective and exploded view of part of the window guide and lift module shown in FIG. 3.

The frame 52 is also molded as to define fore and aft facing, stationary, side guide channels 70, 72 and a third or intermediate guide channel 74. The guide channels 70, 72 are of an identical construction and therefore only the side guide channels 70 will be described in detail. The side guide channel 70 is generally U-shaped, as viewed in cross section, and has its open side facing forwardly of the door 30. The side guide channels 70, 72 are adapted to slidably receive pin guides 76 and 78, respectively, carried by the window 32. The pin guides 76, 78 are of an identical construction and hence, only the pin guide 76 will be described in detail. As best shown in FIG. 7, the pin guide 76 comprises a base 80 which is adapted to be bolted or otherwise secured to the window 32 adjacent its bottom edge 32a and adjacent its front side edge 32b. The pin guide 78 is bolted or otherwise secured to the window 32 adjacent its bottom edge 32a and adjacent rear side edge 32c. The pin guide 76 further includes an L-shaped portion 82 which terminates in a round or circular pin 84, the pin 84 extending parallel to the base 80 but spaced therefrom. The pin 84 is slidably received in the guide channel 70 and the contour of the guide channel 70 guides the path of movement of the window 32 along its front side 32b. Likewise, the pin 84 of the pin guide 78 is slidably guided in the guide channel 72 to guide the movement of the window along its rear side 32c. The guide channels 70, 72 have an upper portion 90 for guiding the front and rear sides of the window 32 along a given path of movement during approximately half of its travel in a downwardly direction towards an open position and a second portion 92 for guiding the movement of the window 32 along a different path of movement during the latter half of its movement toward a fully open position.

The third stationary guide channel 74 is linear and located approximately half way between the side guide channels 70, 72. As best shown in FIG. 5, the third guide channels 74 has a bottom 74a, a pair of opposed sides 74b, and a pair of flanges 74c which extend toward each other but are spaced from each other so as to define a C-shaped channel which is open opposite its bottom 74a.

Figure 4:
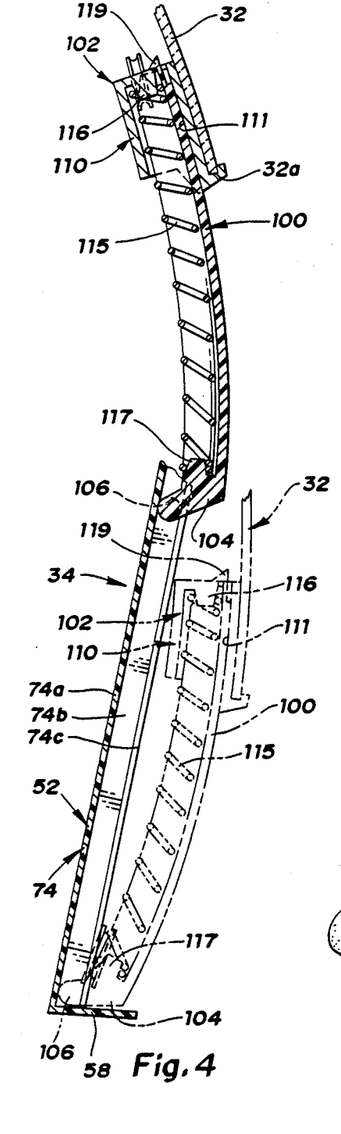
FIG. 4 is an enlarged sectional view taken approximately along the lines 4—4 of FIG. 3.

The stationary guide 74 is adapted to slidably receive a slide 100 of a collapsible guide or guide means 102. The slide 100 comprises an elongated member having a bottom flange 104 which terminates in a pair of transversely extending pin guides 106. The pins 106 are adapted to be slidably received between the bottom 74a and the flanges 74c of the stationary guide 74 so as to be slidably movable therealong. The collapsible guide means 102 also comprises a guide block 110 which is adapted to be suitably secured to the lower edge portion 45 of the window 32, such as by adhesive means. The guide block 110 has a through opening 111 therethrough for slidably receiving the slide 100, the opening 111 and the slide 100 being shaped complementary to each other. The guide block 110 is secured to the window 32 approximately midway between its front and rear side edges 32b and 32c. The guide block 110 and slide 100 are spring biased apart by a compression spring means 115. The compression spring 115 has one end which surrounds a boss 116 at the top of the guide block 110 and its other end in abutting engagement with the bottom of the slide 100 by surrounding a boss 117 thereon. The compression spring biases the guide block and the slide 100 apart from each other to the extended position as shown in FIGS. 3 and 4. To prevent disengagement between the guide block 110 and the slide 100, the slide 100 is provided with a transversely extending tab or ear 119 at its upper end which is adapted to engage the top side of the boss 116 on the guide block 110.

The stationary third guide 74 is linear and extends parallel to the lower portion 92 of the side guide channels 70, 72. The upper portion 90 of the guide channels 70, 72 provides a guide path which is slightly skewed with respect to the guide path of the lower portion 92. This is so that the window 32 is guided through a predetermined path of movement as it is moved from its open position toward its closed position and vice versa.

As is best shown in FIG. 2, when the window 32 is in its closed position and in engagement with the seal 20, the guide arrangement 50 is such that the window 32 as it is being lowered toward its open position will first rapidly move away from the seal 20 and then move downwardly into the compartment of the door 30 along a path as indicated by the phantom lines A in FIG. 2. The window 32 as it is being moved from its closed position towards its open position has its movement guided at its sides by the guide pin 76, 78 along a path of movement which is slightly skewed with respect to the path of movement of the collapsible guide means 102 along the stationary guide track 74. As the window 32 is being lowered, the guide block 110 and the slide 100 move in unison along the stationary guide track 74 due to the compression spring 115 holding the slide 100 and guide block 110 apart. However, since the slide 100 is moving in a linear path inwardly with respect to the path of movement of the side pin guides 76, 78, the window 32 will be pivoted outwardly and rapidly move away from the seal 20. As the window is further moved towards its open position, the slide 100 will move along the stationary guide track 74 until it engages the bottom flange 58 of the frame 52. When this occurs, the slide block 110 will move relative to the slide 100 and compress the spring means 115. At this point, the side pin guide 76, 78 will be located at the start of the lower portion 92 of the side guide channels 70, 72 and thus the sides of the window 32 and the middle of the window will move in parallel paths. The relative movement between the side block and the slide 100 continues until the window is fully received within the compartment 44 of the door 30.

When the window is moved from its open position towards its closed position, the reverse movement will take place. That is, the side pin guides will be raised and moved along the bottom portion 92 of the side guide track channel 70, 72 and the slide block 110 will move relative to the slide 100 as the result of the compression spring 115. As the window 32 is further raised, the side pin guides 76, 78 will move from the lower portion 92 to the upper portion 90 and at the same time the guide block 110 will have its boss portion 116 engage the tab 119 on the slide 100. Thereafter, the pin guides 76, 78 move along the guide portions 90 of the side guide channels 70, 72 and the slide 100 will be raised upwardly in unison with the guide block 110 relative to the stationary guide 74. As the window approaches its closed position, the path of movement of the upper portions of the guide channels 70, 72 is such that the window is caused to be moved inwardly toward the vehicle body structure with the result that the window 32 will bite into or positively engage the seal means 20 to provide a good seal along the side and top edges of the window 32.

The window 32 is adapted to be raised and lowered and supported in all positions to which it is moved by a cable drive window regulator mechanism 120. The cable drive window mechanism 120 comprises four pulleys 122 which are rotatably supported by brackets 124 secured to the four corners of the side frame 52. The cable drive window regulator means 120 further includes a cable 131 which is trained around the four pulleys in a figure eight configuration and with the ends of the cable being drivingly connected with a rotatable drum (not shown) of a suitable cable drive actuator 130. The cable drive actuator 130 could be of any suitable or conventional construction and would include a handle 132 located on the inside of the door 30. The actuator 130 has a housing 133 which is secured to the inner door panel 16 and the actuator is operative to cause the cable 131 to be moved in one direction when the handle 132 is rotated in one direction and in the opposite direction when the handle 132 is rotated in the opposite direction.

The cable 131 of the cable drive window regulator is adapted to be secured to the pin guides 76, 78. As best shown in FIG. 7, the pin guide 76 includes a rectangular integral boss 150 having a rectangular opening 152 therein and circular openings 154 through its top 155 and bottom 156 sides. The cable 131 has a ferrule 160 connected therewith and with the cable 131 being snap fittingly received within the openings 154 and the ferrule 160 received within the opening 152 to drivingly connect the ferrule with the top and bottom sides 155, 156, respectively. This connection between the ferrule 160 and the boss 150 also supports the window 32. In addition, by virtue of the cable 131 being in a figure eight configuration, the cable along the sides connected to the pin guides 76, 78 are caused to be moved in the same direction to effect upward and downward movement of the window 32 in response to the handle 132 being moved in opposite directions. In addition, it should be noted by connecting the cable drive window regulator 130 to the pin guides 76, 78, a drive connection located closely adjacent the sides of the windows is provided which further increases the rotational stability of the window and eliminates rocking of the window as it is being moved between its open and closed positions.

It should be noted at this point that the entire window guide lift and drive arrangement can be preassembled onto the frame 52 prior to installation into the door 30. This enables the window 32 along with its guides 76, 78 and 102 and the cable drive window regulator mechanism 120 to be preassembled onto the frame 52 and the frame 52 to be rapidly connected within the door 30 and disconnected therefrom for service. All that is required is for the frame to be connected to the reinforcement ring 43 at its four locations and the cable drive actuator 130 to be connected to the inner panel 16 of the door 30.

It should be further appreciated that by providing the collapsible guide means 102, that the window 32 when in its raised position is connected to the frame 52 at three locations—its front and rear sides adjacent the bottom edge of the window and the connection between the slide 100 and the stationary guide 74. These connection points define an imaginary triangle and with the lowermost connection point between the slide 100 and the stationary guide 104 being substantially below the bottom edge 32a of the window 32. This provides for a very stable guide and connection arrangement when the window 32 is in its closed position and ensures that a good pressure contact between the window 32 and the seal 20 is effected. It should be further appreciated that by providing the collapsible guide means 102, that the window can still be fully lowered within the vehicle door 30 because the guide means 102 will collapse to allow full lowering movement of the window 32 within the compartment 44 of the door 30. This enables the door 30 to be designed to have a low belt line and still provide good stability for the window when its moved to its closed position.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A frameless door assembly for use with an automotive vehicle having body structure defining a door opening and a seal on the body structure surrounding said opening along its sides and top, said door assembly comprising spaced inner and outer door panels and fore and aft ends which define a compartment having a top opening, a window supported by the door assembly for movement through said top opening between an open position in which the window is disposed within said compartment and a closed position in which the window is disposed substantially above said top opening in the door assembly, said window being engageable with said seal on said body structure when the door assembly is moved to its closed position, stationary guide means for guiding said window when it is moved between its open and closed position, said guide means including first and second spaced side guide channels located adjacent the fore and aft ends of said door assembly, respectively, and a third stationary guide channel located approximately midway between the first and second guide channels, first and second pin guides secured to said window adjacent its bottom edge and slidably connected to said first and second stationary guide channels, respectively, for movement therealong, a collapsible guide means carried by said window and slidably connected to said third guide channel for movement therealong, said collapsible guide means being biased toward an extended position in which its sliding connection with said third stationary guide channel is located a given distance beneath the bottom edge of the window, said collapsible guide means being in its extended position when said window is in its closed position whereby said window is supported at its opposite sides adjacent said top opening in said compartment of said door assembly and at a location generally midway and substantially below its bottom edge to provide a three point connection which forms an imaginary triangle whereby said window is highly stabilized when in its closed position, said collapsible guide means being slidable along said third stationary guide as said window is being moved through a first portion of its movement to its open position until it bottoms against an abutment adjacent the lower end of said third stationary guide channel and then being collapsible as the window is further lowered through a second portion of its movement to its fully open position, and a window regulator mechanism operatively connected with said window for moving said window between its open and closed positions.

2. A frameless door assembly for use with an automotive vehicle having body structure defining a door opening and a seal on the body structure surrounding said opening along its sides and top, said door assembly comprising spaced inner and outer door panels and fore and aft ends which define a compartment having a top opening, a window supported by the door assembly for movement through said top opening between an open position in which the window is disposed within said compartment and a closed position in which the window is disposed substantially above said top opening in the door assembly, said window being engageable with said seal on said body structure when the door assembly is moved to its closed position, a modular stationary guide means for guiding said window when it is moved between its open and closed position, said guide means including first and second spaced side guide channels located adjacent the fore and aft ends of said door assembly, respectively, and a third stationary guide channel located approximately midway between the first and second guide channels, first and second pin guides secured to said window adjacent its bottom edge and adjacent its fore and aft side edges, respectively, said first and second pin guides being slidably connected to said first and second guide channels, respectively, for movement therealong, a collapsible guide means carried by said window and slidably connected to said third guide channel for movement therealong and comprising a slide block secured to said window adjacent its bottom edge and located approximately midway between the side edges of the window, a slide slidably connected to said slide block and having its lower end slidably connected to said third guide channel and spring means operatively connected to said lower end of said slide and said slide block for biasing said slide downwardly to an extended position in which a stop on said slide engages a stop on said guide block and in which the sliding connection between said slide and said third channel guide is located a given distance beneath the bottom edge of the window, said slide of said collapsible guide means being in its extended position when said window is in its closed position whereby said window is supported at its opposite sides adjacent said top opening in said compartment of said door assembly and at a location generally midway between its side edges and substantially below its bottom edge to provide a three point connection which defines an imaginary triangle whereby said window is highly stabilized against in and out movement toward and from the seal when in its closed position, said slide and slide block of said collapsible guide means being slidable in unison along said third guide channel as said window is being moved downwardly through a first portion of its movement toward an open position until the slide engages an abutment adjacent the lower end of said third stationary guide and said slide block thereafter being slidable on said slide in opposition to the biasing force of said spring as the window is further lowered through a second portion of its movement to its fully open position whereby the window can be fully lowered into said door assembly, and a cable drive window regulator mechanism operatively connected with said first and second pin guides for moving said window between its open and closed positions.

3. A frameless door assembly for use with an automotive vehicle having body structure defining a door opening and a seal on the body structure surrounding said opening along its sides and top, said door assembly comprising spaced inner and outer door panels and fore and aft ends which define a compartment having a top opening, a window supported by the door assembly for movement through said top opening between an open position in which the window is disposed within said compartment and a closed position in which the window is disposed substantially above said top opening in the door assembly, said window, when closed, being engageable with said seal on said body structure when the door assembly is moved to its closed position, a modular stationary guide means for guiding said window when it is moved between its open and closed position, said guide means comprising a one piece modular frame including first and second spaced side guide channels located adjacent the fore and aft ends of said door assembly, respectively, and a third stationary guide channel located approximately midway between the first and second guide channels, first and second pin guides secured to said window adjacent its bottom edge and adjacent its fore and aft side edges, respectively, said first and second pin guides being slidably connected with said first and second guide channels, respectively, for movement therealong, a collapsible guide means carried by said window and slidably connected to said third guide channel for movement therealong and comprising a slide block secured to said window adjacent its bottom edge and located approximately midway between the side edges of the window, a slide slidably connected to said slide block and having its lower end slidably connected to said third guide channel and spring means operatively connected to said lower end of said slide and said slide block for biasing said slide downwardly to an extended position in which a stop on said slide engages a stop on said guide block and in which the sliding connection between said slide and said third channel guide is located a given distance beneath the bottom edge of the window, said slide of said collapsible guide means being in its extended position when said window is in its closed position whereby said window is supported at its opposite sides adjacent said top opening in said compartment of said door assembly and at a location generally midway between its side edges and substantially below its bottom edge to provide a three point connection which defines an imaginary triangle whereby said window is highly stabilized against in and out movement toward and from the seal when in its closed position, said slide and slide block of said collapsible guide means being slidable in unison along said third guide channel as said window is being moved downwardly through a first portion of its movement toward an open position until the slide engages an abutment adjacent the lower end of said third stationary guide and said slide block thereafter being slidable on said slide in opposition to the biasing force of said spring as the window is further lowered through a second portion of its movement to its fully open position whereby the window can be fully lowered into said door assembly, said first and second guide channels and said third stationary guide defining guide paths for said first and second pin guides and said slide, respectively, which cause said window to be also moved away from said seal when initially lowered and to be moved into engagement with said seal when approaching its closed position, and a cable drive window regulator mechanism operatively connected with said first and second pin guides for moving said window between its open and closed positions.

4. A frameless door assembly, as defined in claim 3, and wherein inner door panel and fore and aft ends of said door are integral with each other and formed of a plastic material.

5. A frameless door assembly, as defined in claim 4, and which includes a generally rectangular reinforcing ring secured to the inner door panel and to which the one piece modular frame of said modular stationary guide means is secured.

6. A frameless door assembly, as defined in claim 3, and wherein said cable drive window regulator mechanism includes a cable disposed around guide pulleys carried by said modular frame adjacent its four corners to form a figure eight, and wherein said pin guides have a boss thereon provided with an opening which receives a ferrule on the adjacently located cable to drivingly connect the cable to the pin guide.

* * * * *